Sept. 9, 1969  E. J. SMOOT  3,466,600
TRAFFIC CONTROL SIGNALS
Filed June 3, 1968  7 Sheets-Sheet 1

INVENTOR.
EDGAR J. SMOOT
BY
ATTORNEY

INVENTOR.
EDGAR J. SMOOT
ATTORNEY

Sept. 9, 1969      E. J. SMOOT      3,466,600

TRAFFIC CONTROL SIGNALS

Filed June 3, 1968      7 Sheets-Sheet 4

RED TO GREEN SEQUENCE FACE "A" AND FACE "B"

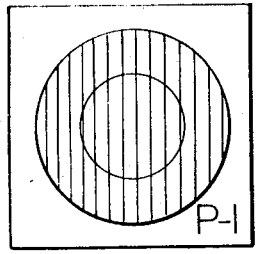
CENTRAL LIGHT & ALL SEC. RED

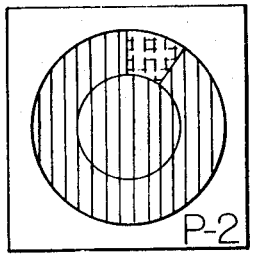
SECTOR № 1 TURNS AMBER

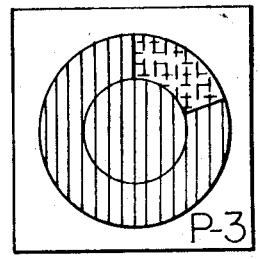
SECTOR № 2 TURNS AMBER

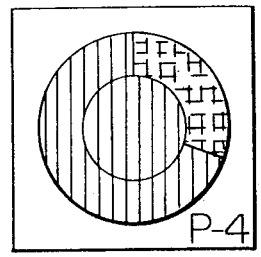
SECTOR № 3 TURNS AMBER

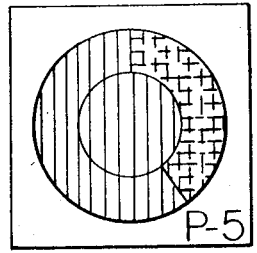
SECTOR № 4 TURNS AMBER

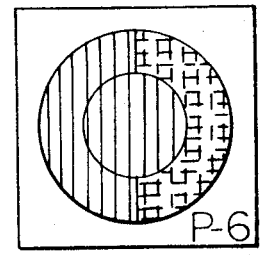
SECTOR № 5 TURNS AMBER

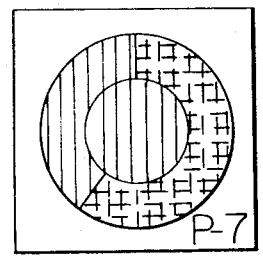
SECTOR № 6 TURNS AMBER

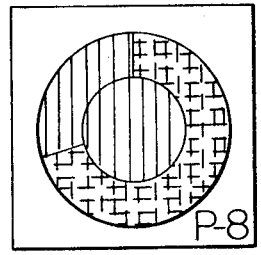
SECTOR № 7 TURNS AMBER

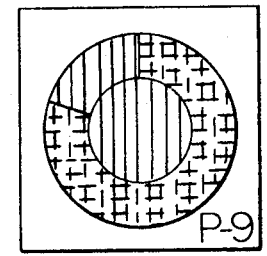
SECTOR № 8 TURNS AMBER

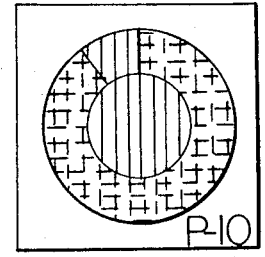
SECTOR № 9 TURNS AMBER

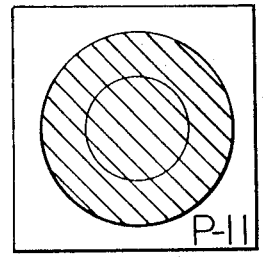
CENTRAL LIGHT & ALL SEC. GREEN

FIG. 4

INVENTOR.
EDGAR J. SMOOT
BY
ATTORNEY

Sept. 9, 1969    E. J. SMOOT    3,466,600
TRAFFIC CONTROL SIGNALS
Filed June 3, 1968    7 Sheets-Sheet 5

GREEN TO RED SEQUENCE FACE "C" AND FACE "D"

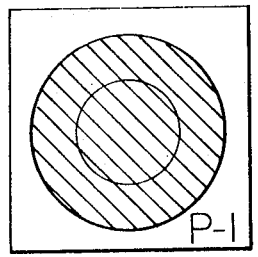
CENTRAL LIGHT & ALL SEC. GREEN

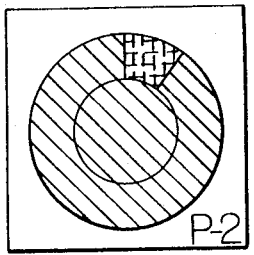
SECTOR №1 TURNS AMBER

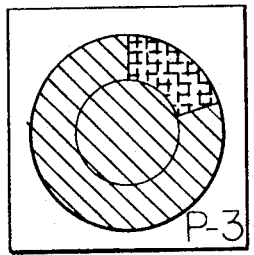
SECTOR №2 TURNS AMBER

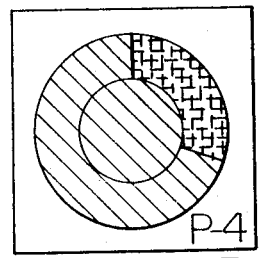
SECTOR №3 TURNS AMBER

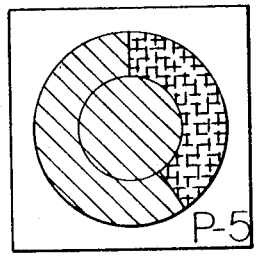
SECTOR №4 TURNS AMBER

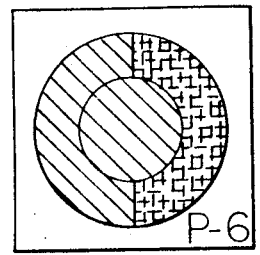
SECTOR №5 TURNS AMBER

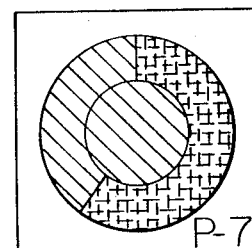
SECTOR №6 TURNS AMBER

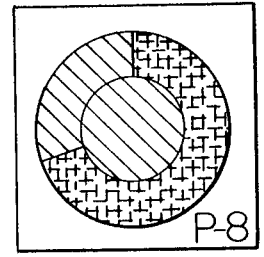
SECTOR №7 TURNS AMBER

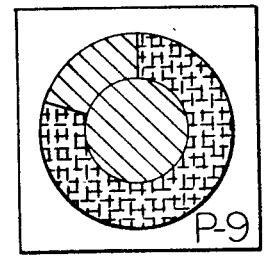
SECTOR №8 TURNS AMBER

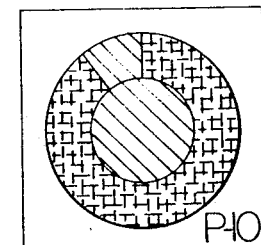
SECTOR №9 TURNS AMBER

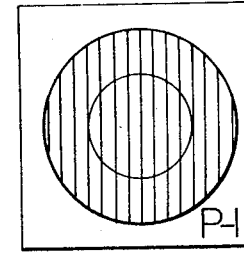
CENTRAL LIGHT & ALL SEC. RED

FIG. 5

INVENTOR.
EDGAR J. SMOOT
BY 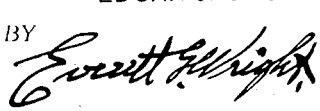
ATTORNEY

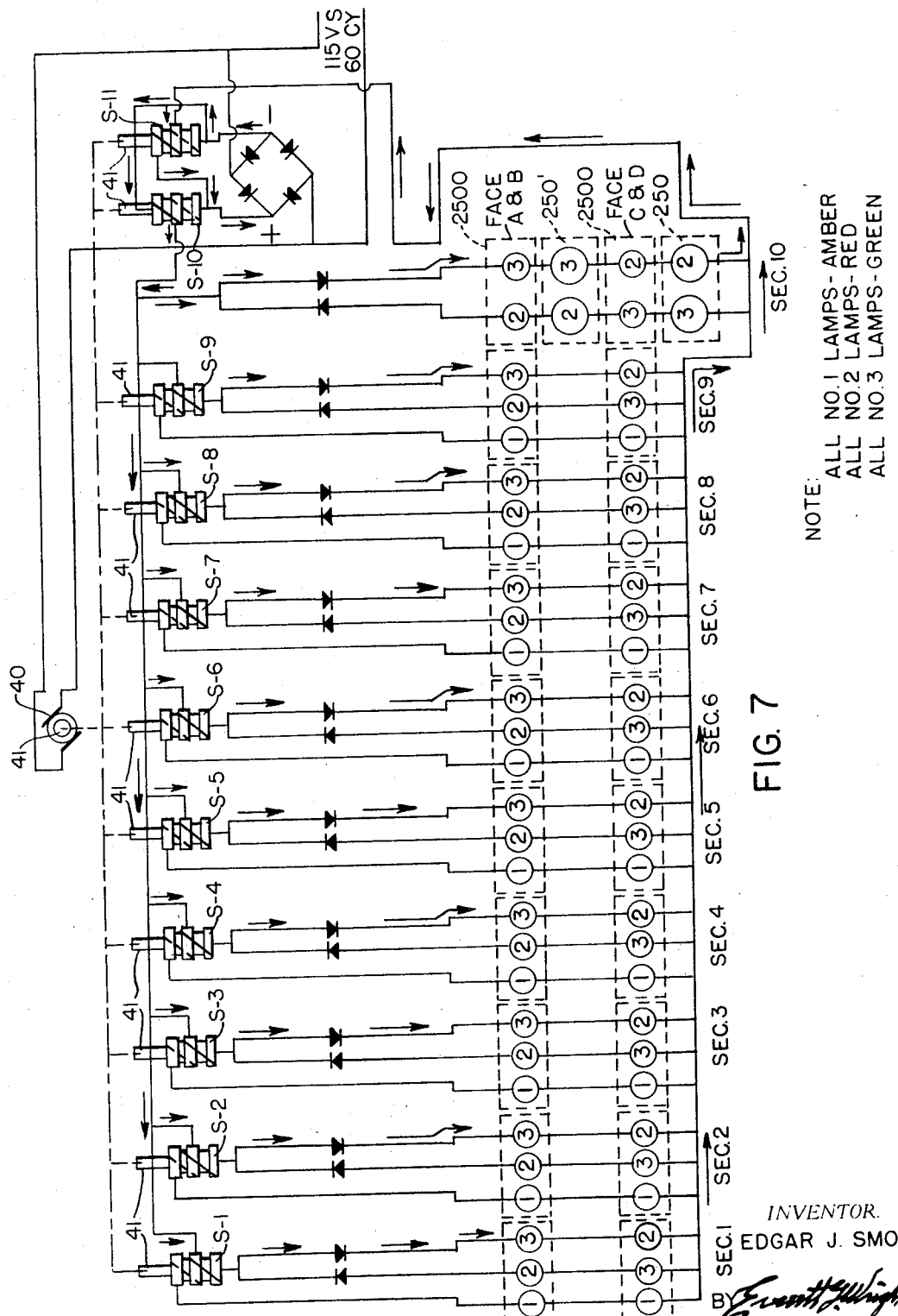

United States Patent Office 3,466,600
Patented Sept. 9, 1969

3,466,600
TRAFFIC CONTROL SIGNALS
Edgar J. Smoot, Dearborn, Mich., assignor of one-half to Robert A. Smoot, Dearborn, Mich.
Continuation-in-part of application Ser. No. 501,353, Oct. 22, 1965. This application June 3, 1968, Ser. No. 733,945
Int. Cl. G08g 1/01
U.S. Cl. 340—43
2 Claims

ABSTRACT OF THE DISCLOSURE

An electrically controlled and illuminated traffic control signal having a plurality of faces for controlling traffic at street intersections, at least one said face including a dominant central circular bull's-eye signal having at least one Red light bulb and at least one Green light bulb therein, said bull's-eye signal being surrounded by an annular sweep signal cluster divided into a plurality of sectors, each sector including one Amber light bulb, one Red light bulb and one Green light bulb, said bull's-eye light bulbs and said sector light bulbs of each said face being connected through timing means to a source of electric current illuminating the bull's-eye and all sectors of said annular bowl: first, all Red, then sequentially and slowly changing illumination in each sector from Red to Amber beginning at the right of top center until all sector lights but those in the last sector are Amber, then changing illumination in said bull's-eye and all sectors to Green, then sequentially changing illumination in each sector beginning at the right of top center from Green to Amber until all sector lights but those in the last sector are Amber, and then changing illumination in said bull's-eye and all sectors to Red, thus providing alternately all Green and then all Red illumination on said one face of said traffic control signal with a circular sweep of Amber light around each said Green bull's-eye signal and Red bull's-eye signal whereby to inform the motorist with adequate notice as to when said Green bull's-eye signal will turn to Red and said Red bull's-eye signal will turn to Green.

---

This application is a continuation-in-part of application Ser. No. 501,353, filed Oct. 22, 1965, entitled Traffic Control Signals, which application issued into Patent No. 3,401,372 on Sept. 10, 1968.

This invention relates to traffic control signals of the type employable at street intersections, and in particular to a traffic control signal which provides adequate bull's-eye Green GO and Red STOP signals together with means which precisely and adequately informs the motorist when a change from a Green GO signal to a Red STOP signal and vice versa will occur so that the motorist may be under proper control of his automobile to meet the required demand in the operation thereof to come to an easy gradual stop, or, to start with reasonable dispatch, all to assure a more even flow of traffic with considerably less incidence of accident risks than presently possible with conventional traffic signals.

Accordingly, the primary object of the instant invention is to provide an improved traffic control signal including an unmistakably clear alternately presented Green GO and Red STOP bull's-eye illumination with ring lighting therearound to inform the motorist of the impending change from a conventional Green GO light to a conventional Red STOP light so that the motorist may more accurately contemplate stopping and actually stop when the Red STOP light is presented to him whereby to avoid intersection accidents caused by accidental "running of the Red STOP light," and, further, to inform the motorist of the impending change from a conventional Red STOP light to a conventional Green GO light so that the motorist may start his vehicle without undue delay when the Green GO light is presented to him whereby to substantially increase the number of vehicles that may cross a given intersection on a Green GO light of a specific duration.

A further object of the instant invention is to provide an electrically controlled and illuminated traffic control signal having oppositely facing angularly related pairs of signals, each signal consisting of a central dominant bull's-eye signal having a Red and a Green light bulb therein and an annular signal cluster disposed around said central dominant bull's-eye signal and divided into a plurality of sectors, each sector including one Amber light bulb, one Red light bulb and one Green light bulb, and timing means first applying electric current alternately to all Red light bulbs of one opposite pair of signals and to all Green light bulbs of the said angularly related opposite pair of signals, then sequentially applying current to the Amber light bulb in each sector of both pairs of signals beginning at the right of top center of each annular signal cluster while simultaneously releasing current from the lighted Red or Green light bulb in each said sector, and then applying current to all Green and Red light bulbs in said angularly related opposite pairs of signals after all of the Amber light bulbs, or all but one of said Amber light bulbs, in each circular cluster have been sequentially lighted and current is released therefrom, whereupon the same cycle of operation is initiated with current applied to all Green light bulbs in said one opposite pair of signals and to all Red light bulbs of the said angularly related opposite pair of signals.

Still another object of the instant invention is to provide an electrically controlled and illuminated traffic control signal having a plurality of faces for controlling traffic at street intersections, at least one face of which includes a central dominant bull's-eye signal having at least one Red and one Green light bulb therein and an annular signal cluster bowl disposed around said bull's-eye signal and means dividing said annular signal cluster bowl into a plurality of sectors, each sector including one Amber light bulb, one Red light bulb and one Green light bulb, said bull's-eye bulbs and said annular cluster bowl bulbs being connected through timing means to a source of electric current illuminating said bull's-eye and said sectors within the annular cluster bowl at said one face: first, all Red, then sequentially slowly changing illumination in each sector beginning at the right of top center from Red to Amber until all but the last sector are Amber, then changing illumination in said bull's-eye and in all sectors to Green, then sequentially slowly changing illumination in each sector beginning at the right of top center from Green to Amber until all sectors but the last are Amber, and then changing illumination in said bull's-eye and in all sectors to Red, the said slow changing of illumination in said annular cluster bowl in each instance from Red to Amber or Green to Amber, as the case may be, having the effect of gradually wiping out the Red or Green annular cluster bowl signal respectively by an arcuate sweep of Amber light.

Other objects of the invention will become obvious by reference to the following detailed description taken in connection with the accompanying drawings, in which:

FIG. 4 is a diagrammatic view showing a RED to GREEN sequence of bull's-eye and sector illumination changes of Faces A and B.

FIG. 5 is a diagrammatic view showing a GREEN to RED sequence of bull's-eye and sector illumination changes of Faces C and D occurring simultaneously with the RED to GREEN sequence of changes of Faces A and B illustrated in FIG. 4.

Figure 6:
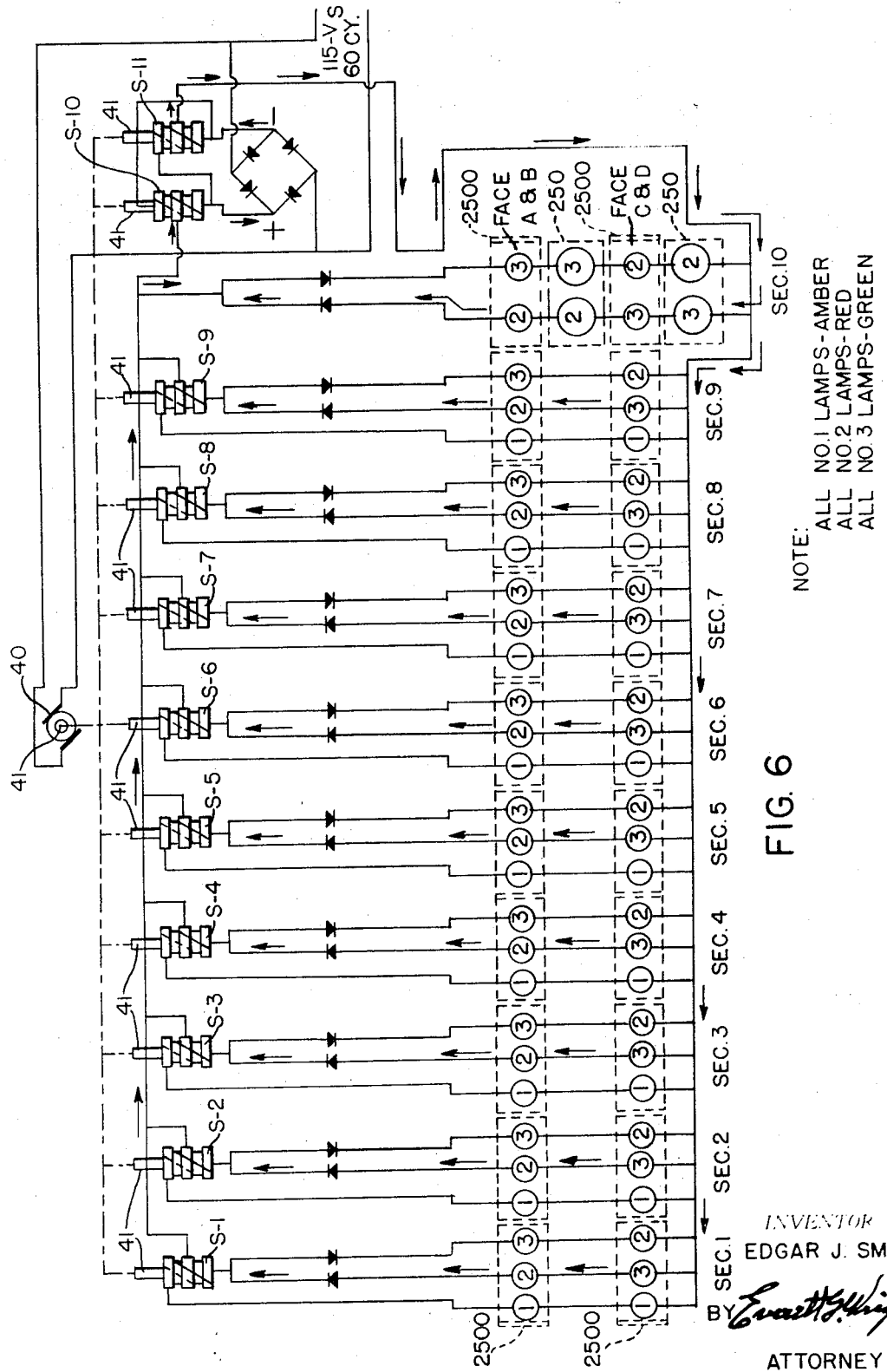

FIG. 6 is a wiring diagram of a preferred timer circuit that may be employed to accomplish the desired change of RED to GREEN illumination in Faces A and B, first with progressively clockwise changes of said RED illumination to AMBER in the several sectors until all but one RED sector of said Faces A and B have changed to AMBER, whereupon the illumination in the bull's-eye and all sectors in the Faces A and B change to fully GREEN.

FIG. 7 is a wiring diagram of the said preferred timer circuit similar to FIG. 6 except that it is conditioned to accomplish the desired change of GREEN to RED illumination in Faces C and D, first with progressively clockwise changes of said GREEN illumination in the several sectors to AMBER until all but one GREEN sector of said Faces C and D have changed to AMBER, whereupon the illumination in the bull's-eye and all sectors in the Faces C and D change to fully RED; the signal changes of Faces C and D of FIG. 7 may take place simultaneously with signal changes of Faces A and B of FIG. 6.

Referring now to the drawings wherein like reference characters refer to like and corresponding parts throughout the several views, the particular embodiment of the invention disclosed therein for illustrative purposes is a four faced traffic control signal 10 of a type employable at a typical 180 degree street intersection. It is understood that traffic control signals of the invention also may be constructed in a like and similar manner with one or more faces angularly related as required to control the flow of traffic along a street or highway or at the intersection or meeting of two or more streets or highways having other than 180 degree relationships with respect to each other.

The housing 100 of the traffic control signal 10 preferably consists of a top 11, a bottom 12 having a rectangular access hatch 13 therein fixed thereto by suitable studs 14, and four sides 15 each having an access door 16 hinged thereto by suitable hinges 17 and securable in its closed position by anchorage elements 18. The top 11 and bottom 12 of the housing 100 are preferably provided with vent apertures 110 and 120 respectively therein. At the center of the said top 11 is a hood 19 with vent apertures 190 at the sides thereof covered by a spaced overhang 191 which prevents entry of rain and dirt into the housing 100 while permitting warm air to escape therefrom. Extending upwardly from the central portion of the said hood 19 is a suitable anchorage eye 192 by means of which the traffic control signal 10 may be hung from a supporting arm or cable, not shown.

Figure 1:
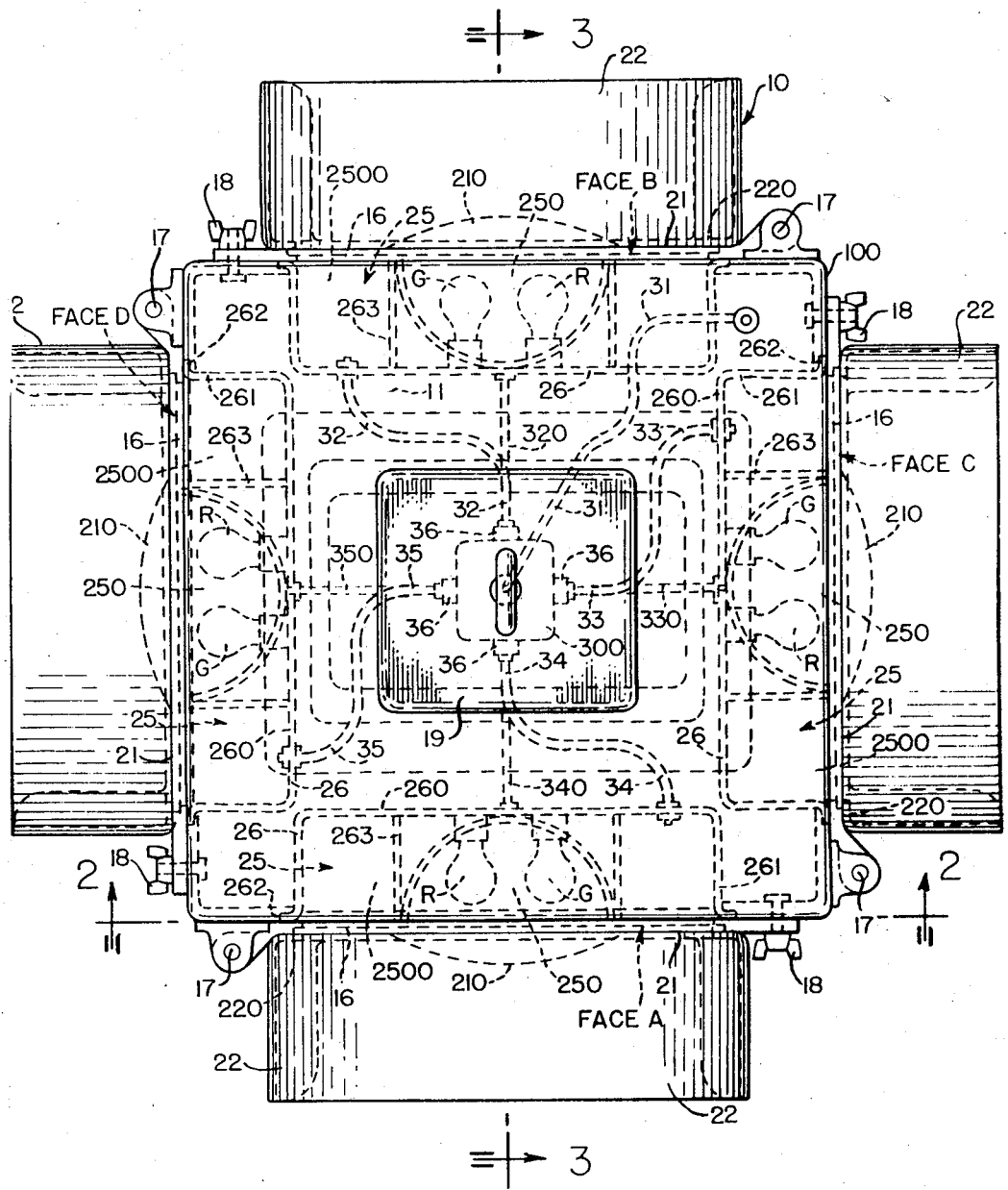
FIG. 1 is a top plan view of a traffic control signal illustrating the invention, the said traffic control signal being of a type employable at a conventional 180 degree street intersection.
Figure 2:
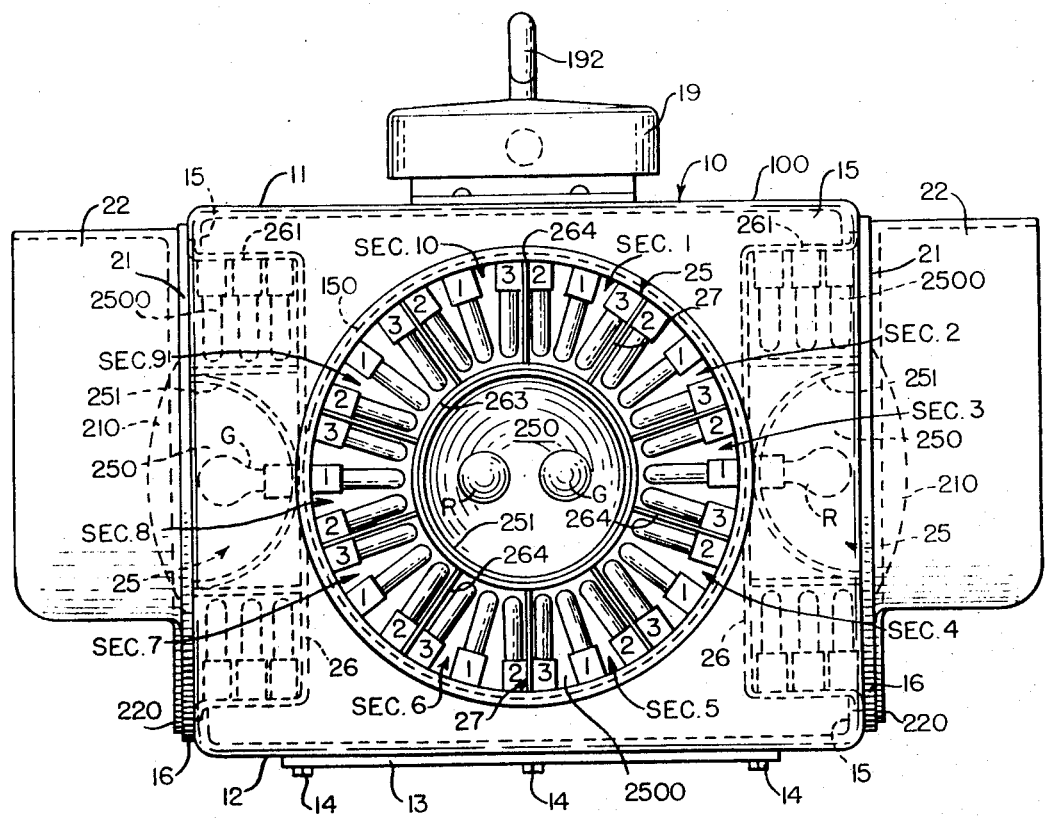
FIG. 2 is a side elevational view taken on the line 2—2 of FIG. 1 with the access door and door hardware removed.
Figure 3:
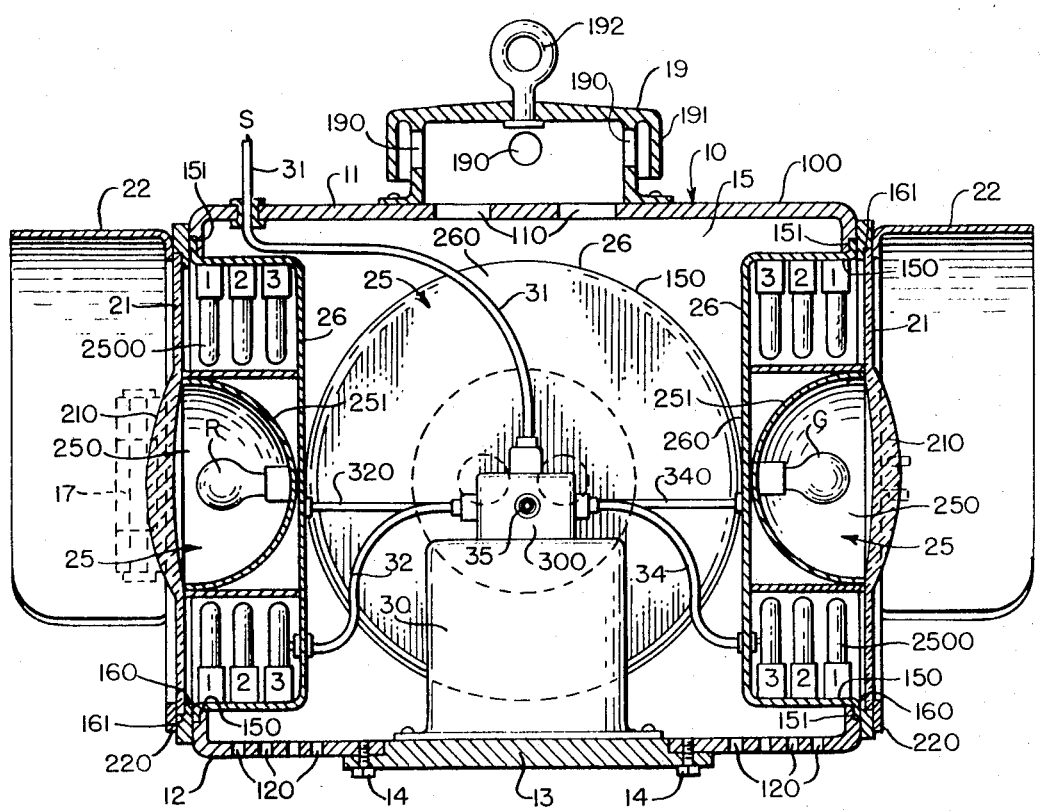
FIG. 3 is a transverse sectional view taken on the line 3—3 of FIG. 1.

Each side 15 of the housing 100 is circularly apertured at 150, and is annularly notched at 151 around said aperture 150 to accommodate a circular signal cluster 25 having a signal cluster housing 26 as best shown in FIGS. 2 and 3. An access door 16 is provided to each signal cluster 25 which has a circular aperture 160 therein substantially the same size as the circular signal cluster housing 26, and is annularly notched at 161 therearound to accommodate a circular glass or plastic lens 21 preferably fixed therein by the annular base flange 220 of a hood element 22 removably secured by suitable means (not shown) to the outside face of each access door 16. The said lens 21 may be provided with a suitable preferably central bull's-eye 210 therein to intensify illumination therefrom and control its direction. The said hood elements 22, the lens 21 and the bull's-eye 210 thereof, if employed in the said lens 21, are so formed as to limit and/or direct visibility of signal lights emanating from the lens 21 of the traffic control signal 10 to provide the desired angle of view of motorists and pedestrians according to the particular placement of the said traffic control signal 10.

Each signal cluster 25 of each signal Face A, B, C and D preferably is mounted in a circular pan shaped housing 26 having a bottom 260, a circular outer wall 261, an outwardly disposed annular flange 262, and a central annular hub 263. The said annular flange 262 of each signal cluster housing 26 fits in the annular notch 151 formed in a side 15 of the traffic control signal housing 100 around the circular aperture 150 therein, and is secured thereto by suitable means, not shown. The dished portion of the circular pan shaped signal cluster housing 26 is divided by the annular central hub 263 forming a central bull's-eye signal 250 and an annular sweep signal cluster 2500 therearound. A spider 27 divides the said annular sweep signal cluster 2500 into a plurality of sectors, for example 10. The said spider 27 is preferably formed of ten equally spaced radially disposed partitions 264 extending between the annular central hub 263 and the outer circular wall 261 thereof forming the ten sectors of the said annular sweep signal cluster 2500, which are numbered Sec. 1 through Sec. 10 inclusive.

One of the said partitions 264 is preferably radially disposed vertically at a 12 o'clock position from the said central hub 263, and, as viewed in FIG. 2, Sec. 1 and Sec. 10 are disposed clockwise and counterclockwise respectively from said 12 o'clock position. Each of Sec. 1 through Sec. 9 inclusive of the housing 26 of each annular sweep signal cluster 2500 of signal cluster 25 has therein three electric light sockets numbered 1, 2 and 3 having therein Amber, Red and Green electric lamps or light bulbs respectively; however, Sec. 10 has only two electric light sockets numbered 2 and 3 having therein Red and Green light bulbs. In other words, No. 1 lights are Amber when illuminated, No. 2 lights are Red when illuminated, and No. 3 lights are Green when illuminated. The intensity of illumination from each Amber, Red or Green electric lamp or light bulb in each sector of the annular sweep signal cluster 2500 is sufficient to fully illuminate said sector either Amber, Red or Green respectively when electric current is applied to any of said light bulbs through a suitable timer 30.

The central bull's-eye signal 250 disposed within the central hub 263 forming the inner limit of the said annular sweep signal cluster 2500 of each signal cluster 25 has therein two electric light sockets numbered 2 and 3 having respectively therein Red and Green electric lamps or light bulbs. A suitable parabolic or other reflector 251 is positioned within each central hub 263 to make the electric light bulbs therein extremely effective in providing a well lighted effective bull's-eye signal 250 relatively dominant with respect to the illumination provided in the annular sweep signal cluster 2500 therearound. Obviously, any suitable arrangement for effective lighting of the bull's-eye signals 250 may be employed.

Electric current is applied to each of the several lamps or light bulbs of each of the several signal clusters 25, each of which include a bull's-eye 250 and an annular sweep signal cluster 2500. The said electric current is supplied from a source of electric current S through a main cable 31 to the timer 30, and from the timer 30 through distribution cables 32, 33, 34 and 35 to the sweep signal clusters 2500 at Faces A, B, C and D respectively, and through distribution cables 320, 330, 340 and 350 to the bull's-eye signal at Faces A, B, C and D respectively. Suitable connectors 36 of a quick connect-disconnect type are preferably employed to connect the said main and distribution cables to a timer junction box 300 positioned on top of the timer 30. This permits the timer 30 to be replaced readily for maintenance whenever required.

The traffic control signal 10 disclosed herein to illustrate the invention may be operated by any suitable timer 30 such as shown in FIGS. 6 and 7, the timer mechanism shown being of a motor-cam actuated micro-switch type; however, it is to be understood that other timer mechanisms may be employed to accomplish the particular light sequences deisred at any installation of traffic control signals embodying the invention. Obviously, the timer 30 may be incorporated in the traffic signal housing 100 as shown in the drawings, or, it may be housed in a signal box remote therefrom.

Referring now to FIGS. 6 and 7, a typical timer mechanism 30 of one type employable in traffic control signals of the invention is shown diagrammatically therein. It is obvious that other timer mechanisms may be employed to accomplish electric control of sequential illumination of the lights or bulbs 1, 2 and 3 in each of the preferably ten sectors of the annular sweep signal cluster 2500 and the lights or light bulbs 2 and 3 in the central bull's-eye signal 250 of the signal cluster 25 of each angularly related pair or other arrangement of signal faces of traffic control signals embodying the invention, and that the traffic control signals of the invention may be suitably arranged to control traffic along a highway and at intersections or meetings of one or more highways or streets.

In the illustrative embodiment of a traffic control signal 10 of the invention disclosed herein, the timer 30 may consist, for example, of a 1 r.p.m., 3 watt, 100 volt A.C. synchronous motor 40 having a shaft 41 on which is mounted a plurality of cams (not shown) of conventional cam-roller operated type switches S–1 through S–11 inclusive. In FIG. 6, the said switches are positioned to illuminate all Red Lights 2 in Faces A and B and all Green lights 3 in Faces C and D. In FIG. 7, the said switches are all positioned to illuminate all Green lights 3 in Faces A and B and all Red lights 2 in Faces C and D. The direction of flow of current in the circuits of each of FIGS. 6 and 7 is indicated by full line arrows therein, which current flow direction is preferably maintained by the diodes illustrated by blackened triangles in the circuit diagrams and by switches S–10 and S–11 shown in said circuits.

The cams of the cam-roller operated switches S–1 through S–11 inclusive are formed in a conventional manner to provide the desired signal operation. In the particular illustrative example given, Face A is opposite Face B and the signals thereof function alike; that is, Face A and Face B signals turn Red to Green simultaneously. Also, Face C is opposite Face D and the signals thereof likewise function alike, but out of phase with Faces A and B so that when Faces A and B are Red or Green, Faces C and D are Green or Red respectively.

When the central bull's-eye signal 250 and the annular sweep signal cluster 2500 of any Face A and B or C and D is illuminated Red or Green respectively for a certain period of time, say thirty seconds, then the Red or Green lights respectively in Sectors 1 through 9 inclusive of the annular sweep signal cluster 2500 in each of said Face A, B, C and D are extinguished sequentially at timed intervals, say three seconds, while the Amber light in each of said Sectors 1 through 9 inclusive of each said annular sweep signal cluster 2500 in Face A, B, C and D are sequentially illuminated at said three second intervals and remain illuminated until all of said Sectors 1–9 inclusive show Amber; then, after the Amber light of Sector 9 has been illuminated for three seconds, the Red light in the bull's-eye signal 250 and all Amber lights in Sectors 1–10 inclusive of each annular sweep signal cluster 2500 of Faces A and B become Green, and, the Green light in the bull's-eye signal and all Amber lights in Sectors 1–10 inclusive of each annular sweep signal cluster 2500 of Faces C and D become Red.

FIGS. 4 and 5 illustrate respectively the Red to Green and the Green to Red sequences of illumination for Faces A and B and C and D disclosing preferred sequential illumination positions P–1 through P–11 inclusive in each of said FIGS. 4 and 5 which show the gradual change or sweep of illumination in the annular sweep signal clusters 2500 from full Red to full Green or vice versa, which gradual change includes a sequential extinguishing at timed intervals of sectors of the Red or Green illumination of Faces A and B and C and D, and substituting therefor an Amber light for the extinguished Red or Green lights sweeping clockwise from a 12 o'clock position sequentially through Sectors 1–9 inclusive, after which, and at a timed interval, say three seconds, all Sectors 1–10 inclusive which, at the beginning of the Red to Green sequence and the Green to Red sequence were full Red and full Green respectively, become illuminated full Green and full Red as the case may be. Also, in each of said FIGS. 4 and 5, the bull's-eye signal 250 shows Red and Green respectively all during the time that the annular sweep signal clusters 2500 gradually change or sweep from full Red and Green to Amber sequentially through Sectors 1–9 inclusive, and, when all Sectors 1–10 inclusive turn to Green or Red, as the case may be, the bull's-eye signal 250 also turns to Green or Red as shown respectively in illumination positions P–11 of each of said FIGS. 4 and 5.

Referring again to FIG. 6, the timer mechanism 30 has all of its cam-roller type switches S–1 through S–11 closed as indicated by the full lines diagonally thereacross, and, as so conditioned, current from the source S flows in the direction indicated by the arrows illuminating all Red lamps or lights 2 and all Green lamps or lights 3 in each of Secs. 1–10 inclusive of the annular sweep signal cluster 2500. With the timer motor 40 running, the motor shaft 41 turns a cam (not shown) in each cam-roller type switch S–1 through S–11 to sequentially throw said switches S–1 through S–11 at timed intervals, say three seconds, to accomplish the lighting sequence of signal Faces A and B and C and D as hereinabove described and as illustrated in FIGS. 4 and 5.

In other words, with all of the switches S–1 through S–11 closed as indicated by the full lines in FIG. 6, current is applied to the Red lamps or lights 2 in all Secs. 1–10 inclusive of the annular sweep signal cluster 2500 of Faces A and B and to the Green lamps or lights 3 in all Secs. 1–10 inclusive of the annular sweep signal cluster 2500 of Faces C and D. As the synchronous motor 40 turns its shaft 41, the contacts of each switch S–1 through S–11 sequentially change at given intervals from their full line position as indicated in FIG. 6 to the dotted line position therein which accomplishes the hereinbefore desired lighting sequence of the annular sweep signal cluster 2500 of signal Faces A and B and C and D.

It will be noted by reference to FIG. 6 that after Sec. 9 turns Amber and an interval of time elapses, say three seconds, Switch 10 illuminates all lamps or lights of both the sweep signal cluster 2500 and the bull's-eye signal 250 in Faces A and B Green and all lamps or lights of both the sweep signal cluster 2500 and the bull's-eye signal 250 in Faces C and D Red, while Switch 11 reverses the current flow in the circuit as shown in FIG. 7, whereupon the Red to Green sequence of Faces A and B and the Green to Red sequence of Faces C and D now begin to occur in Faces C and D and Faces A and B respectively, thus returning the Faces C and D and Faces A and B to their condition previously described for Faces A and B and C and D respectively at the initiation shown in FIG. 6 of one complete cycle of operation of a signal light illustrating the invention.

The timing of the illumination of the several segments of any one traffice control signal face may be regulated by the particular selection and relative arrangement of cams in the timer-switch means so that any desired dwell of Red, Amber or Green illumination may be had in the signal sequence of any signal sector and/or face, and, it is obvious that all signal faces need not be necessarily timed alike whereby to suitably control the movement of traffic from opposite and/or angularly related directions.

As hereinbefore pointed out, traffic control signals of the invention may be modified from the typical 4-way intersection traffic control signal herein disclosed in detail to use traffic control signals of the invention along highways, at oddly angled meeting of streets and highways, and elsewhere when and as required, and it is obvious many changes may be made in the size, shape, arrangement and details of the invention to accomplish its use at other than the typical 4-way intersections.

I claim:

1. An electrically controlled and illuminated traffic control signal including a housing having one or more illuminable traffic control faces, at least one of said faces comprising
    a circular pan shaped signal cluster bowl and means dividing said bowl into a central hub forming a central bull's-eye signal and an annular sweep signal and an annular sweep signal cluster therearound divided into a plurality of sectors radiating from said central hub,
    one Red and one Green light bulb in said central bull's eye signal,
    one Amber, one Red and one Green light bulb in each segment of said annular sweep signal cluster, and
    timer-switch means controlling the illumination of at least one of said illuminable traffic control faces,
    said timer-switch means being connected to a source of electric current applying said electric current first to the Red light bulb in said central bull's-eye signal and to the Red light bulb in all sectors of said sweep signal cluster illuminating said one face all RED,
    said timer-switch means sequentially disconnecting current supply at timed intervals from the Red bulb in each sector of said annular sweep signal cluster of said one face clockwise as said one face is viewed except the Red bulb in one sector, and applying current substantially simultaneously to the Amber light bulb in each sector except said one sector as said current is disconnected from each said Red bulb whereby to change illumination with a visual sweeping effect in said annular sweep signal cluster of said one face from Red to Amber except in said one sector which remains Red,
    said timer-switch means then disconnecting current supply from said Amber light bulbs, the said Red bulb remaining lighted in said one sector, and the Red bulb in said central bull's-eye signal simultaneously after all said Amber light bulbs have been lighted, and then applying current to the Green light bulb in said central bull's-eye signal and the Green light bulbs in all sectors of said sweep signal cluster illuminating said one face all GREEN,
    said timer-switch means then sequentially disconnecting current supply at timed intervals from the Green bulb in each sector of said annular sweep signal cluster of said one face clockwise as said one face is viewed except the Green bulb in one sector, and applying current simultaneously to the Amber light bulb in each sector except said one sector as said current is disconnected from each said Green bulb whereby to change illumination with a visual sweeping effect in said annular sweep signal cluster of said one face from Green to Amber except in one segment which remains Green,
    said timer-switch means then disconnecting current supply from said Amber light bulbs and the Green bulb remaining lighted of said annular sweep signal cluster and the Green bulb in said central bull's-eye signal simultaneously after all said Amber light bulbs have been lighted, and then applying current to the Red light bulb in said central bull's-eye signal and the Red light bulbs in all sectors of said annular sweep signal cluster illuminating said one face all RED.

2. An electrically controlled and illuminated traffic control signal including a housing having one or more illuminable traffic control faces, at least one of said faces comprising
    a central hub including a bull's-eye signal having therein at least one Red light bulb and at least one Green light bulb,
    an annular sweep signal cluster element disposed around said central hub divided into a plurality of sectors radiating from said hub including in each sector one Amber, one Red and one Green light bulb,
    a synchronous motor driven timer-switch means connected to a source of electric current and to each of said bull's-eye and sweep signal cluster light bulbs applying electric current to each said Red bulbs illuminating said one face all Red,
    said timer-switch means being conditioned to
      (a) disconnect current supply sequentially at timed intervals from the Red bulb in each sector of said sweep signal cluster clockwise from 12 o'clock as said one face is viewed,
      (b) apply current to the Amber bulb of each sector of said sweep signal cluster substantially simultaneously as said current is disconnected from each said Red bulb therein whereby to change illumination in said sweep signal cluster from Red to Amber with a visual sweeping effect in said one face,
      (c) then disconnect current supply simultaneously from the Red bulb in said bull's-eye and from all Amber bulbs in said sweep signal cluster, and apply current substantially simultaneously to the Green bulb in said bull's-eye and to all Green bulbs in said sweep signal cluster,
      (d) then disconnect current supply sequentially at timed intervals from the Green bulb in each sector of said sweep signal cluster clockwise from 12 o'clock as said one face is viewed,
      (e) apply current to the Amber bulb of each sector of said sweep signal cluster substantially simultaneously as said current is disconnected from each said Green bulb therein whereby to change illumination in said sweep signal cluster from Green to Amber with a visual sweeping effect in said one face, and
      (f) then disconnect current supply simultaneously from the Green bulb in said bull's-eye and from all Amber bulbs in said sweep signal cluster, and apply current substantially simultaneously to the Red bulb in said bull's-eye and to all Red bulbs in said sweep signal cluster.

References Cited

UNITED STATES PATENTS 3,401,372  9/1968  Smoot _____ 340—43

THOMAS B. HABECKER, Primary Examiner

U.S. Cl. X.R.

315—259